United States Patent [19]

Morelli

[11] Patent Number: 4,663,034
[45] Date of Patent: May 5, 1987

[54] HYDRAULIC FILTER SYSTEM FOR EXCAVATION EQUIPMENT

[76] Inventor: Aldo Morelli, 25 Rockwood Ter., Jamaica Plain, Mass. 02130

[21] Appl. No.: 795,918

[22] Filed: Nov. 7, 1985

[51] Int. Cl.$^4$ .................. B01D 27/10; B01D 35/06
[52] U.S. Cl. .................. 210/132; 210/222; 210/223; 210/254; 210/257.1; 210/259; 210/295
[58] Field of Search .......... 55/100; 210/695, 806, 210/130, 222, 223, 257.1, 259, 295, 132, 254; 123/196 A

[56] References Cited

U.S. PATENT DOCUMENTS

| | | | |
|---|---|---|---|
| 3,139,403 | 6/1964 | Cramer et al. .................. | 210/222 |
| 3,342,339 | 9/1967 | Riolo .................. | 210/223 |
| 4,026,805 | 5/1977 | Fowler .................. | 210/223 |
| 4,495,068 | 1/1985 | Rosaen .................. | 210/223 X |

Primary Examiner—Richard V. Fisher
Assistant Examiner—W. Gary Jones
Attorney, Agent, or Firm—Robert T. Gammons

[57] ABSTRACT

A magnetic filter module and system embodying the same for removing magnetic materials from lubricating oils used in hydraulic systems such as supplying oil to hydraulic excavators. The filter module includes one or more filter elements each having an elongate cartridge, a plurality of permanent magnets disposed about the cartridge and a plurality of non-magnetic spacers disposed about the cartridge between the permanent magnets.

11 Claims, 3 Drawing Figures

HYDRAULIC FILTER SYSTEM FOR EXCAVATION EQUIPMENT

BACKGROUND OF THE INVENTION

Hydraulic excavators require relatively large volumes of oil for their operation and due to the nature of the equipment and the surroundings in which they are used, the oil becomes contaminated with metal particles within a relatively short time so that frequent replacement of oil is required in order to maintain the equipment. Failure to replace the oil results in rapid deterioration, inefficient operation and, ultimately, replacement and since such equipment is very expensive, it is vitally important to provide for maintaining clean oil in the system at all times and to continuously clean the oil of any metal particles incurred into the system.

SUMMARY OF THE INVENTION

As herein illustrated, the invention relates to filter means for hydraulically-operated heavy equipment, specifically hydraulic excavators and the like, however, it is to be understood that it can be used in conjunction with any equipment requiring the use of large volumes of oil for the purpose of maintaining the oil clean and free of abrasive metal particles. In accordance with the invention, for this purpose a filter module is employed in the hydraulic system, comprising a housing defining an enclosure, a filter element supported in the enclosure comprising an elongate cartridge of uniform cross section, one end of which is closed and the other end open, at least two slots lengthwise of the cartridge at diametrically-opposed sides of its longitudinal axis, a plurality of permanent magnets disposed about the cartridge in longitudinally-spaced relation, a plurality of non-magnetic spacers disposed about the cartridge between the permanent magnets, said spacers containing openings in communication with the slots at their inner ends and in communication with the surrounding enclosure at the outer ends, means connecting the open end of the cartridge with the source of oil to be filtered and means providing for exit of the filtered oil from the enclosure to the system. The elongate cartridge is desirably of circular cross section and the magnets and spacers of annular configuration. There is a support disposed in the chamber above the bottom defining with the bottom a plenum chamber, said support containing an opening and the cartridge is disposed within the chamber with its lower open end in communication with the opening in the support. A tubular coupling connects the opening in the support with the lower open end of the cartridge. There is a top support disposed in the chamber in spaced, parallel relation to the bottom support containing openings concentric with the openings in the bottom support within which the upper closed ends of the cartridge are received. There is a removable closure at the open upper end of the cartridge. Desirably, the housing defines a chamber of rectangular, horizontal and vertical section and the bottom plate contains longitudinally-disposed, spaced, parallel rows of openings and a corresponding number of tubular cartridges are disposed in the chamber in communication with the openings in the bottom plate. The system may include a hydraulic tank and a conductor connecting the chamber above the plenum chamber with the hydraulic tank. Desirably, the hydraulic tank contains a filter element through which the filtered oil is delivered from the chamber into the hydraulic tank. A bypass connects the plenum chamber to the hydraulic tank, including a bypass valve. Desirably, there is a filter module of the aforesaid kind disposed in the bypass from the plenum chamber to the hydraulic tank.

The invention will now be described in greater detail with reference to the accompanying drawings, wherein.

Figure 3:
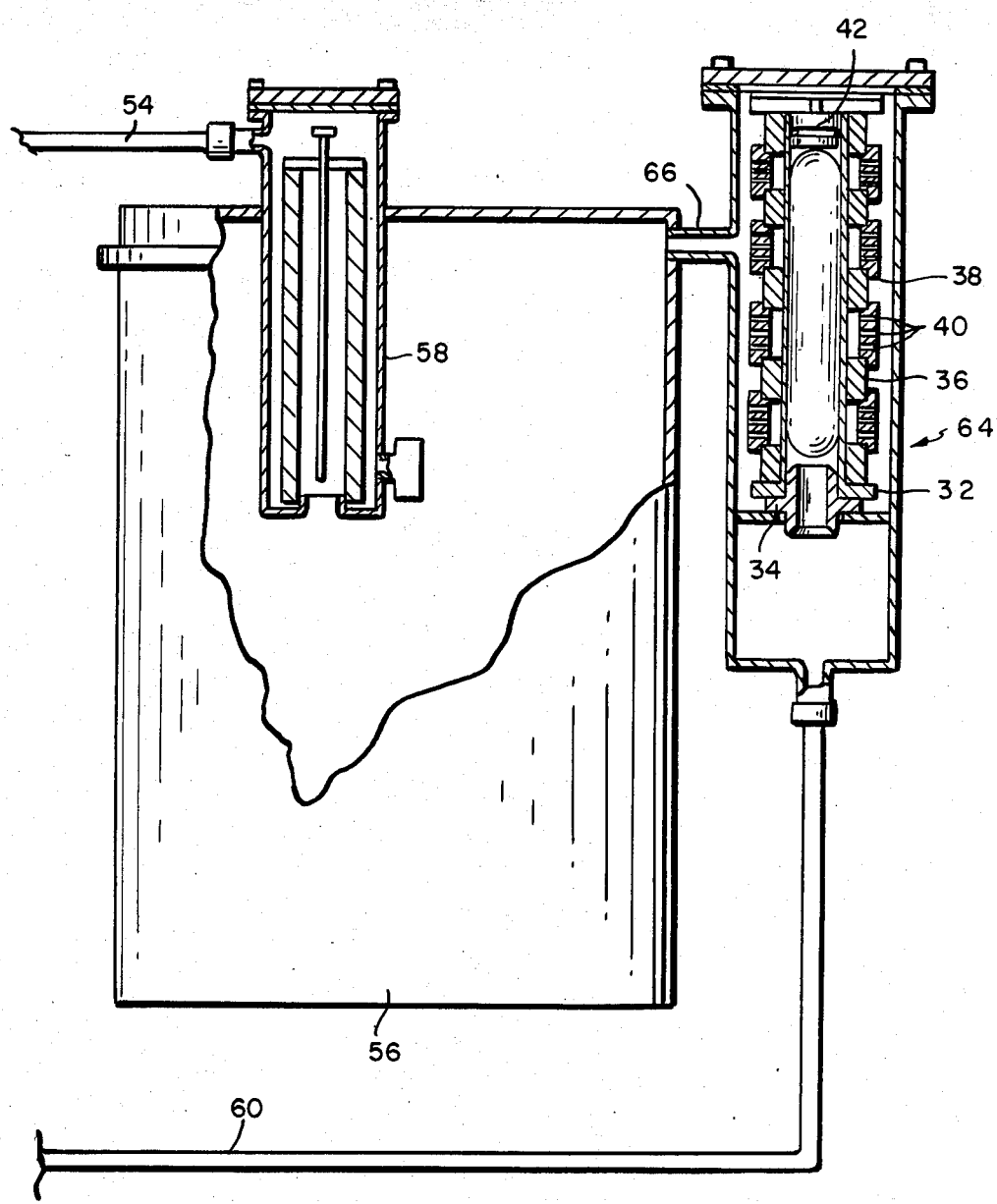

FIG. 3 diagrammatically illustrates the embodiment of the filter unit in conjunction with a hydraulic tank.

Figure 1:
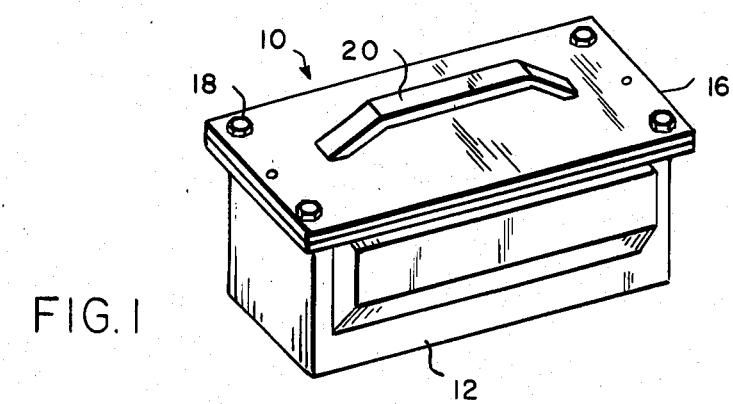
FIG. 1 is a perspective of a filter unit.
Figure 2:
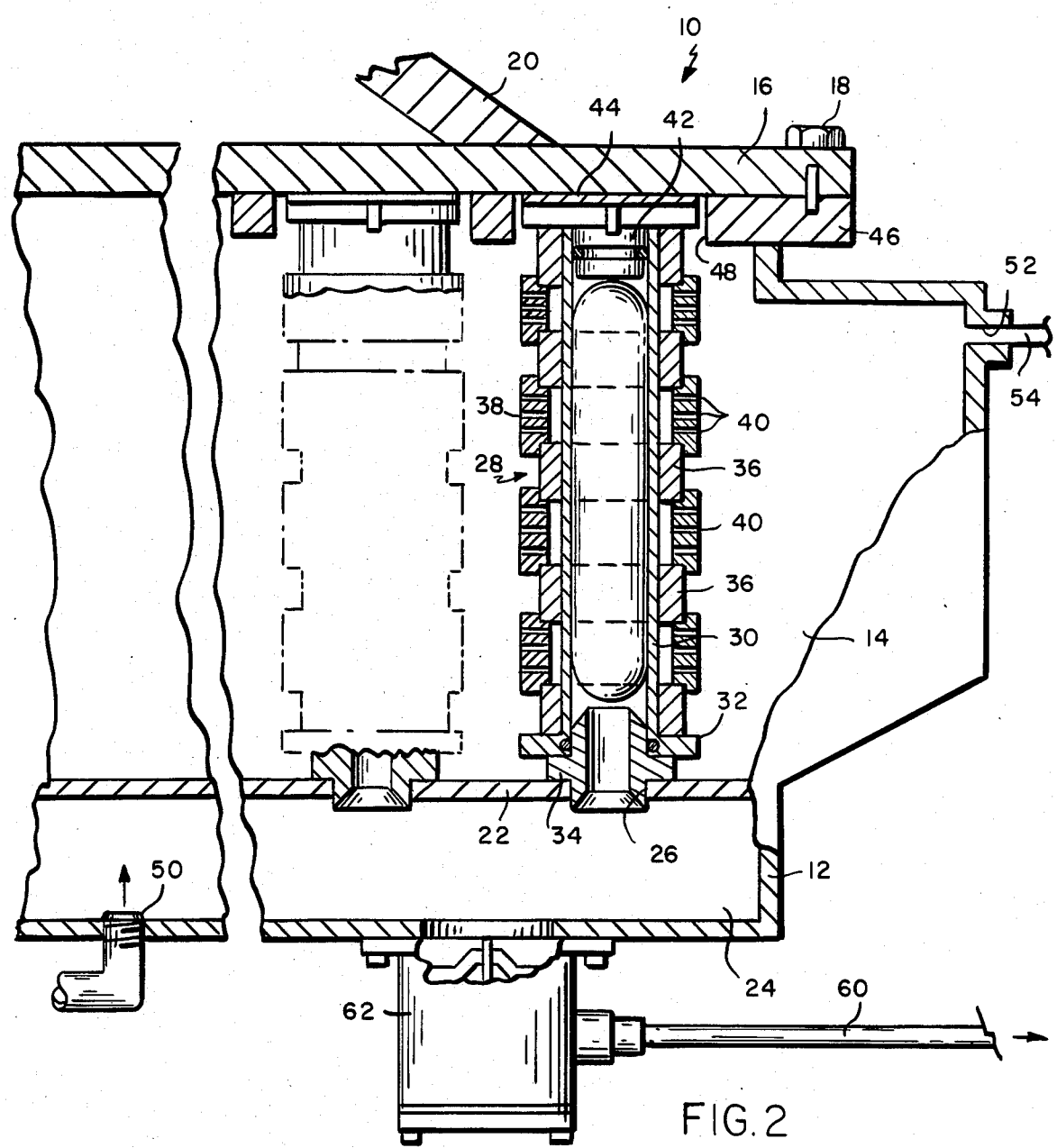
FIG. 2 is a vertical section taken on the line 2—2 of FIG. 1.

Referring to the drawings, FIG. 1, the filter unit 10 is of generally rectangular, horizontal and vertical section and comprises an enclosure 12 defining an interior chamber 14 closed at the top by a closure plate 16 which is removably secured thereto at its four corners by bolts 18. The plate 16 is provided with a handle 20 by which it may be easily lifted off the open top of the housing for the purpose of cleaning the interior structure.

Within the housing adjacent the bottom, but spaced therefrom, is a bottom plate 22 which is coextensive in length and width with the bottom and defines with the bottom a plenum chamber 24. The bottom plate 22 contains longitudinally and transversely-spaced openings 26 of circular configuration. Above each opening 26, there is disposed in the chamber 14 above the plenum chamber filter modules 28. Each filter module comprises an elongate, tubular structure 30, the lower end of which is provided with a radial flange 32. A tubular coupling element 34 connects the lower end of the tube 30 with the opening 26. A plurality of annular permanent magnets 36 are disposed about the tubular cartridge 30 in vertically-spaced relation and supported in such vertically-spaced relation by a plurality of annular, non-magnetic spacers 38. The spacers 38 contain radially-disposed openings 40. The tubular cartridge 30 contains diametrically-disposed, elongate slots so that the interior of the tubular cartridge is in communication with the interior of the chamber 14 above the plenum chamber by way of the radial openings 40. The upper end of the tubular cartridge is closed by a closure 42 which fits into the open upper end and which is retained therein by a spring element 44 above which is disposed the cover plate 20. The upper ends of the modules are held in vertically-spaced relation with the lower ends by means of a top plate 46 containing openings 48 concentric with the openings 26.

At the bottom of the housing 12, there is provided an inlet opening 50 through which the oil to be filtered is introduced into the plenum chamber for distribution from the plenum chamber to the several filter modules described above. An outlet 52 is provided in the chamber 14 above the plenum chamber for conducting filtered oil from the chamber to the system within which it is used.

As herein shown, the filtered oil is delivered from the filter chamber by way of a conductor 54 to a hydraulic tank 56 from which oil is supplied to the hydraulic system, for example, that of a hydraulic excavator. Generally, the hydraulic tank 56 is provided with a conventional filter module 58 and the conductor 54 is connected to the upper end of the filter module 58.

In the event that some obstruction should occur in the filter unit 10, a bypass conductor 60 is provided which is connected at one end by a valve 62 to the plenum chamber and which is connected at its other end to a filter module 64 of the kind described with reference to FIG. 1 which, in turn, is connected to the hydraulic tank by way of the outlet 66. The valve 62 is operable at a predetermined rise in pressure due to the blockage of the filter module 28 in the unit 10 to bypass the oil by way of the conductor 60 to the filter module 64 and from thence into the hydraulic tank 56.

As described above, the filter unit is provided with a removable cover 20 so as to afford ready access to the interior of the chamber and removal of the elements comprising the filter modules for the purpose of cleaning. A remarkable feature of the filter unit resides in the fact that it not only removes particles of iron and steel from the oil, but also particles of silicon, aluminum and brass due to the fact that these non-magnetic particles become coated with iron or steel due to rubbing contact therewith so that these coated non-magnetic particles are also removed. As a consequence, the oil is cleared of not only magnetizable particles, but also non-magnetizable particles.

As related above, the system and the filter module described is designed especially for maintaining the oil in hydraulically-operated excavators continuously clean in order to provide for efficient operation and improve their longevity. It is to be understood, however, that the system may be used with any equipment where oil is required for hydraulic operation. Further, it is to be understood that a single module or a plurality of modules can be used, depending upon the size of the equipment involved and the volume of oil which must be maintained.

It should be understood that the present disclosure is for the purpose of illustration only and includes all modifications or improvements which fall within the scope of the appended claims.

What is claimed is:

1. A filter module comprising a housing defining an enclosure, a filter element supported in the closure comprising an elongate cartridge of uniform cross section, one end of which is closed and the other end open, at least two slots longitudinally of the cartridge at diametrically-opposed sides of its longitudinal axis, a plurality of permanent magnets disposed about the cartridge in longitudinally-spaced relation, a plurality of non-magnetic spacers dispoed about the cartridge between the permanent magnets, said spacers defining annular spaces circumferentially of the cartridge between magnets and containing openings in communication at their inner ends with the annular spaces and at their outer ends with the surrounding enclosure, means connecting the open end of the cartridge with a source of oil to be filtered and means providing for exit of the filtered oil from the enclosure.

2. A filter module comprising a housing defining a chamber, an elongate cartridge of circular cross section closed at one end and open at the other supported within the chamber, at least two longitudinal slots lengthwise of the cartridge at diametrically opposite sides of the longitudinal axis, a plurality of annular permanent magnets positioned in longitudinally-spaced relation on the cartridge, a plurality of non-magnetic annular spacers disposed on the cartridge between the annular magnets in abutting engagement with adjacent magnets such as to define therewith annular spaces between magnets, said spacers containing holes in communication at their inner ends with said annular spaces and at their outer ends with the chamber, means connecting the open ends of the cartridge to the source of oil to be filtered and means provided for exit of the filtered oil from the enclosure.

3. A filter module comprising a housing defining a chamber, a bottom support disposed in the chamber above the bottom of the chamber defining with the bottom of the chamber a plenum chamber, said bottom support containing an opening, an elongate, tubular cartridge disposed in the chamber on the bottom support, said cartridge being closed at its upper end and open at its lower end with its open lower end in communication with the opening in the bottom support, said cartridge containing at least two diametrically-disposed, longitudinal slots providing communication between the interior of the cartridge and the chamber above the support, a plurality of annular permanent magnets positioned in axially-spaced relation on the cartridge, a plurality of annular non-magnetic spacers disposed on the cartridge between the magnets and in abutting engagement with adjacent spaces and defining therewith annular spaces between magnets, said non-magnetic spacers containing a plurality of holes, in communication at their inner ends with said annular spaces and at their outer ends with the surrounding enclosure, means at the bottom of the housing defining an inlet opening to the plenum at the bottom of the chamber and means defining an outlet opening from the chamber above the bottom support.

4. A filter module according to claim 3 wherein there is a tubular coupling element connecting the opening in the bottom support and the lower open end of the cartridge.

5. A filter module according to claim 3 wherein there is a top support disposed in the chamber in spaced, parallel relation to the bottom support, containing openings concentric with the openings in the bottom support within which the upper end of the cartridge is received.

6. A filter module according to claim 3 wherein there is a removable closure at the upper end of the cartridge.

7. A filter system comprising a housing defining a chamber of rectangular, horizontal and vertical section, a bottom plate disposed in the chamber in spaced, parallel relation to the bottom of the chamber, defining with the bottom of the chamber a plenum chamber, said bottom plate containing longitudinally-disposed, spaced, parallel rows of openings, a corresponding number of tubular cartridges disposed in the chamber closed at their upper ends and open at their lower ends, means connecting the open lower ends of the cartridges with the openings in the bottom plate, a top plate supporting the upper closed ends of the cartridges in vertically-disposed relation to the open lower ends, each cartridge containing at least two diametrically-disposed, longitudinal slots providing communication between the interior of the cartridges and the chamber above the bottom plate, a plurality of annular permanent magnets disposed about the cartridges in longitudinally-spaced relation, a plurality of, non-magnetic spacers disposed about the cartridges between the magnets, in abutting engagement with adjacent magnets and defining therewith annular spaces circumferentially of the cartridge between said magnets, said non-magnetic spacers containing openings providing communication at one end with the annular spaces and at the other end with the chamber above the plenum chamber, removable means at the top of the cartridges defining the closed upper ends of the cartridges and retaining means for retaining the magnets and the spacers in place, means mounted at the bottom of the housing defining an inlet opening to the plenum chamber and means in the housing defining an outlet from the chamber above the bottom plate.

8. A filter system according to claim 7 wherein the system includes a hydraulic tank and there is a conductor connecting the chamber above the plenum chamber with the hydraulic tank.

9. A filter system according to claim 8 wherein the hydraulic tank contains a filter element through which the filtered oil from the filter system is delivered into the hydraulic tank.

10. A filter system according to claim 7 comprising a hydraulic tank and a bypass connecting the plenum chamber of the housing to the hydraulic tank, including a bypass valve.

11. A filter system according to claim 10 wherein an additional tubular cartridge is disposed in the bypass from the plenum chamber to the hydraulic tank.

* * * * *